(12) United States Patent
Brand et al.

(10) Patent No.: US 11,148,327 B2
(45) Date of Patent: Oct. 19, 2021

(54) METHOD FOR FORMING A MUD MOTOR STATOR

(71) Applicants: Marcel Brand, Braunschweig (DE); Helmut G. Benning, Hannover (DE); Harald Grimmer, Niedersachsen (DE)

(72) Inventors: Marcel Brand, Braunschweig (DE); Helmut G. Benning, Hannover (DE); Harald Grimmer, Niedersachsen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 710 days.

(21) Appl. No.: 15/940,083

(22) Filed: Mar. 29, 2018

(65) Prior Publication Data

US 2019/0299497 A1     Oct. 3, 2019

(51) Int. Cl.
*F04C 2/00* (2006.01)
*B29C 41/20* (2006.01)
*E21B 4/02* (2006.01)
*B29C 41/08* (2006.01)

(52) U.S. Cl.
CPC .............. *B29C 41/20* (2013.01); *B29C 41/08* (2013.01); *E21B 4/02* (2013.01)

(58) Field of Classification Search
CPC .............................. B29C 41/20; B29C 41/08
See application file for complete search history.

(56) References Cited

U.S. PATENT DOCUMENTS

| | | |
|---|---|---|
| 3,699,197 A | 10/1972 | Egger |
| 3,944,641 A | 3/1976 | Lemelson |
| 4,991,292 A | 2/1991 | Bostel |
| 5,066,518 A | 11/1991 | Klingen |
| 5,318,416 A | 6/1994 | Hantschk et al. |
| 5,894,042 A | 4/1999 | Ferralli |

(Continued)

FOREIGN PATENT DOCUMENTS

| | | |
|---|---|---|
| AT | 500932 B2 | 5/2006 |
| CN | 2910533 Y | 6/2007 |

(Continued)

OTHER PUBLICATIONS

Marshall, USCERL Report ERDC/CERL TR-07-4, https://erdc-library.erdc.dren.mil/jspui/bitstream/11681/20176/1/CERL-TR-07-4.pdf (Year: 2007).*

(Continued)

*Primary Examiner* — Leith S Shafi
*Assistant Examiner* — Nicholas R Krasnow
(74) *Attorney, Agent, or Firm* — Cantor Colburn LLP

(57) ABSTRACT

A method of forming a mud motor stator having a passage including a first end defining a first opening, a second end defining a second opening and an intermediate portion extending therebetween includes introducing a liner material into the passage at one of the first end and the second end of the stator, inserting a mandrel having a contoured surface into the passage through one of the first end and the second end of the stator, shifting one of the mandrel and the stator relative to the other of the mandrel and the stator, and flowing the liner material over the contoured surface of the mandrel from the one of the first and second ends toward the other of the first and second ends to form a liner on the inner surface of the passage.

19 Claims, 4 Drawing Sheets

(56) References Cited

U.S. PATENT DOCUMENTS

| | | | |
|---|---|---|---|
| 5,913,977 | A | 6/1999 | Nichols |
| 6,158,988 | A | 12/2000 | Jager |
| 6,543,132 | B1 | 4/2003 | Krueger et al. |
| 7,192,260 | B2 | 3/2007 | Lievestro et al. |
| 7,396,220 | B2 | 7/2008 | Delpassand et al. |
| 7,739,792 | B2 | 6/2010 | Lee et al. |
| 7,828,533 | B2* | 11/2010 | Podmore ............... F04C 2/1075 418/48 |
| 7,867,558 | B1 | 1/2011 | Weisenberg |
| 7,951,755 | B2 | 5/2011 | Wu et al. |
| 8,777,598 | B2 | 7/2014 | Akbari et al. |
| 9,347,266 | B2 | 5/2016 | Akbari et al. |
| 9,369,010 | B2 | 6/2016 | Tamaki |
| 9,610,611 | B2 | 4/2017 | Bartscherer et al. |
| 2003/0119610 | A1* | 6/2003 | Tzivanis ............ B29C 45/14065 473/384 |
| 2004/0131716 | A1 | 7/2004 | Neubauer |
| 2004/0190367 | A1* | 9/2004 | Wierzbicki .......... G05D 11/135 366/140 |
| 2005/0285305 | A1 | 12/2005 | Neuroth |
| 2008/0000083 | A1 | 1/2008 | Wood et al. |
| 2008/0023123 | A1 | 1/2008 | Downton et al. |
| 2008/0251963 | A1 | 10/2008 | Steiner |
| 2008/0286503 | A1 | 11/2008 | Kampf |
| 2008/0304992 | A1* | 12/2008 | Hooper ................. F04C 2/1075 418/48 |
| 2009/0110658 | A1 | 4/2009 | Sakamoto et al. |
| 2009/0304843 | A1 | 12/2009 | Steiner et al. |
| 2010/0086425 | A1 | 4/2010 | Steele et al. |
| 2010/0221500 | A1 | 9/2010 | Steiner et al. |
| 2010/0284843 | A1 | 11/2010 | Jager et al. |
| 2011/0116960 | A1 | 5/2011 | Akbari et al. |
| 2011/0116961 | A1 | 5/2011 | Akbari et al. |
| 2011/0271527 | A1 | 11/2011 | Lee et al. |
| 2012/0058264 | A1 | 3/2012 | Filou et al. |
| 2012/0067967 | A1 | 3/2012 | Delden et al. |
| 2012/0141672 | A1 | 6/2012 | Setoguchi et al. |
| 2012/0148432 | A1 | 6/2012 | Butuc et al. |
| 2013/0052067 | A1 | 2/2013 | Hohl et al. |
| 2013/0056443 | A1 | 3/2013 | Ramier et al. |
| 2013/0251572 | A1 | 9/2013 | Butuc et al. |
| 2015/0226364 | A1 | 8/2015 | Bartscherer et al. |
| 2016/0186747 | A1 | 6/2016 | Ramier et al. |
| 2017/0189936 | A1 | 7/2017 | Bartscherer et al. |
| 2020/0282677 | A1* | 9/2020 | Wiesemann ...... B29C 45/14622 |

FOREIGN PATENT DOCUMENTS

| | | |
|---|---|---|
| CN | 103378697 A | 10/2013 |
| DE | 1020080005669 A1 | 7/2009 |
| JP | 59115765 A | 7/1984 |
| JP | 08080566 A | 3/1996 |
| JP | 11047663 A | 2/1999 |
| RU | 2498890 C1 | 11/2013 |
| WO | 2013126546 A1 | 8/2013 |
| WO | 2014007090 A1 | 1/2014 |
| WO | 2017030526 A1 | 2/2017 |

OTHER PUBLICATIONS

"ProFlow"—User Manual for the ProFlow 1K (NPL 2017), https://support.pva.net/Guide/User+Manual+for+the+ProFlow+1K/180 (Year: 2017).*

FOSZCZ—https://www.plantengineering.com/articles/understanding-progressive-cavity-pumps/ (Year: 2000).*

Brand, "Pre-Contoured Stator 'No-Hole' Elastomer-Lining"; Baker Hughes; Mar. 2017; 11 pages.

International Search Report and Written Opinion for International Application No. PCT/US2015/014791; International Filing Date Feb. 6, 2015; Report dated May 26, 2015 (pp. 1-11).

International Search Report and Written Opinion for International Application No. PCT/US2019/024459; International Filing Date Mar. 28, 2019; Report dated Jul. 10, 2019 (pp. 1-7).

Notification of Transmittal of the International Preliminary Report; PCT/US2015/014791; dated May 22, 2015; 8 pages.

Suppliers Showcase; Rubber World, Feb. 2013 (Feb. 2013) [retrieved on Oct. 15, 2013 (Oct. 15, 2013)]. Retrieved from the internet:, http://digitaleditions.walsworthprintgroup.com/display_article.php?id=1325159#; 4 pages.

* cited by examiner

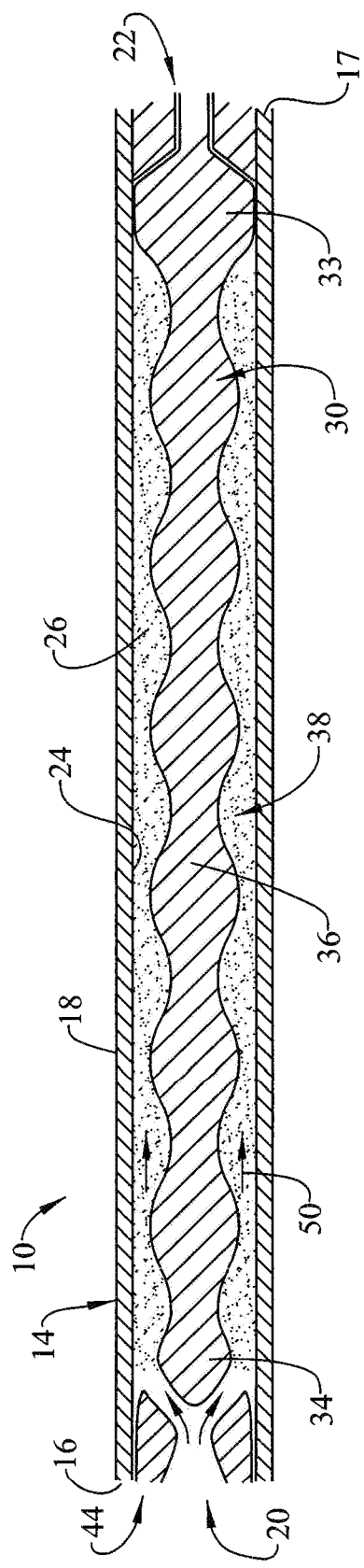
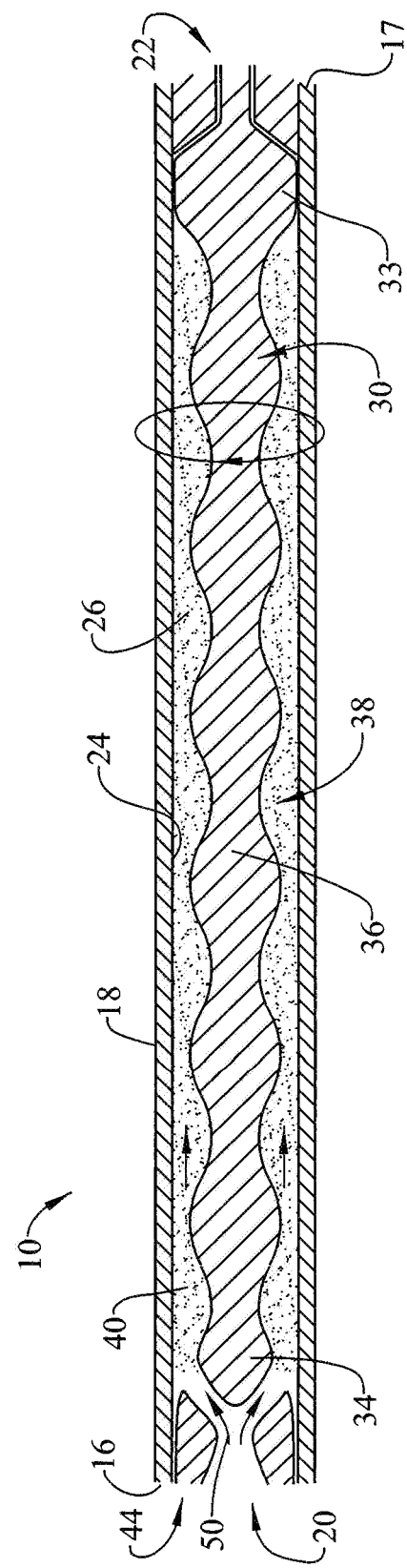

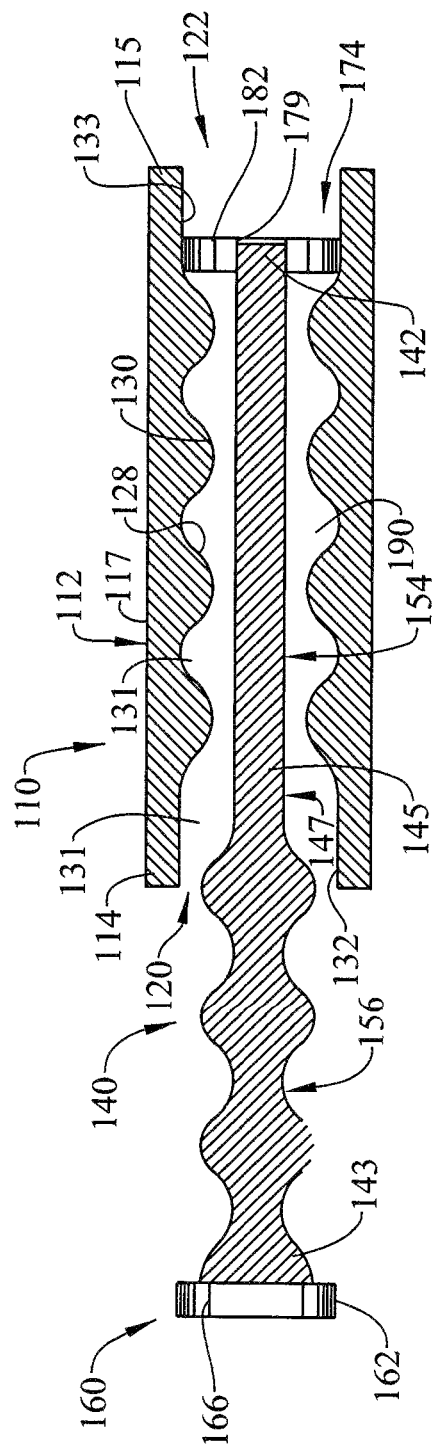
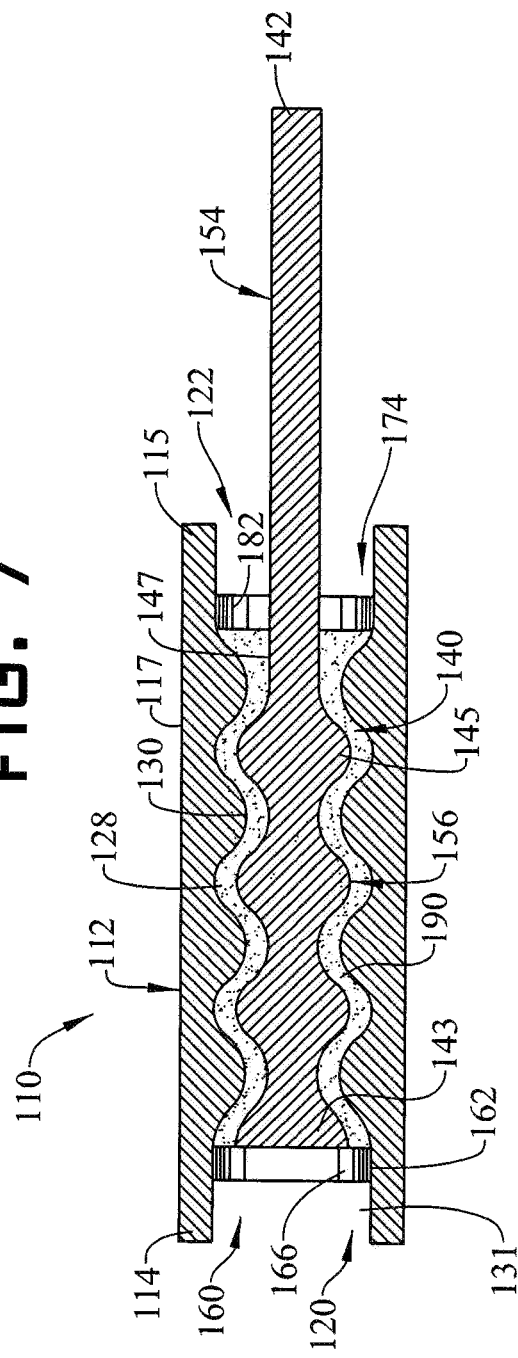
FIG. 7
FIG. 8

METHOD FOR FORMING A MUD MOTOR STATOR

BACKGROUND

In the resource exploration and recovery industry, the boreholes are formed in a formation for the purpose discovering and/or extracting formation fluids. In most cases, a drill is moved into the formation to create the borehole. The drill may be operated by a mud motor which relies on a flow of fluid or drilling mud to generate rotation energy. A mud motor typically includes a stator and a rotor. The stator may include either a smooth bore or a lobed bore. Typically, a liner formed from a compliant material is provided on the stator. In the case of a smooth bore stator, the liner may define lobes. The rotor includes a lobed outer surface that interacts with lobes on the stator. Drilling mud flowing between the stator and the rotor results in relative rotation.

In most cases, the lining is injected through holes formed in the stator. The lining flows between an inner surface of the stator and an outer surface of a core. Over time, the liner hardens. Once hardened, the rotor and stator may rotate relative to one another. In operation, the holes formed in the stator create localized stress zones that shorten an overall service life of the mud motor. When a lining fails, a mud motor must be taken out of service for repair or replacement.

Removing a mud motor from a formation, repairing and/or replacing the mud motor, and running the mud motor back down into the formation is a time consuming and costly endeavor. Accordingly, the art would be receptive to manufacturing techniques that would prolong an overall service life of a mud motor.

SUMMARY

In accordance with an aspect of an exemplary embodiment, a method of forming a mud motor stator having a passage including a first end defining a first opening, a second end defining a second opening and an intermediate portion extending therebetween includes introducing a liner material into the passage at one of the first end and the second end of the stator, inserting a mandrel having a contoured surface into the passage through one of the first end and the second end of the stator, shifting one of the mandrel and the stator relative to the other of the mandrel and the stator, and flowing the liner material over the contoured surface of the mandrel from the one of the first and second ends toward the other of the first and second ends to form a liner on the inner surface of the passage.

BRIEF DESCRIPTION OF THE DRAWINGS

The following descriptions should not be considered limiting in any way. With reference to the accompanying drawings, like elements are numbered alike:

FIG. 1 depicts a mud motor stator and system for lining the mud motor stator, in accordance with an aspect of an exemplary embodiment;

FIG. 2 depicts a liner material being directed into the mud motor stator of FIG. 1, in accordance with an aspect of an exemplary embodiment;

FIG. 7 depicts a mud motor stator and system for lining the mud motor stator, in accordance with another aspect of an exemplary embodiment; and FIG. 8 depicts the mud motor stator of FIG. 7 during a lining operation.

DETAILED DESCRIPTION

Figure 3:
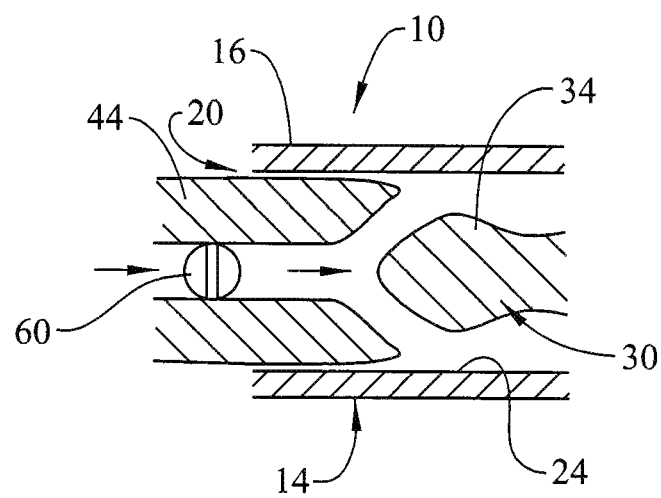
FIG. 3 depicts a valve arranged at a first end of the mud motor stator of FIG. 1, in accordance with an aspect of an exemplary embodiment.

A detailed description of one or more embodiments of the disclosed apparatus and method are presented herein by way of exemplification and not limitation with reference to the Figures.

A mud motor stator, formed in accordance with an aspect of an exemplary embodiment, is indicated generally at 10 in FIG. 1. Mud motor stator 10 includes a body 14 having a first end 16, a second end 17 and an intermediate portion 18 extending therebetween. First end 16 defines a first opening 20 and second end 17 defines a second opening 22. Body 14 includes an inner surface 24 defining a passage 26. In the exemplary aspect shown, passage 26 includes a substantially constant diameter extending from first end 16 to second end 17.

In accordance with an exemplary aspect, a mandrel 30 may be inserted into passage 26 to initiate a liner application process. Mandrel 30 includes a first end portion 33, a second end portion 34 and an intermediate section 36 including a selected contour 38. Selected contour 38 includes a geometry that is desired to be imparted to an elastomeric liner 40 (FIG. 2) formed on inner surface 24 in a manner that will be discussed herein.

A liner material delivery nozzle 44 may be placed at first opening 20. As shown in FIG. 2, liner delivery nozzle 44 is fixed relative to body 14 and mandrel 30. An elastomeric liner material 50 may be introduced into passage 26 through liner material delivery nozzle 44. As liner material 50 flows into passage 26 mud motor stator 10 may be rotated relative to mandrel 30. Specifically, mud motor stator 10 may be rotated, mandrel 30 may be rotated or both mud motor stator 10 and mandrel 30 may be rotated. If both mud motor stator 10 and mandrel 30 are rotated, each is rotated in an opposing direction. The relative rotation of mud motor stator 10 and mandrel 30 creates a pumping action in passage 26 drawing liner material 50 towards second end 17. Liner material 50 may emerge from second opening 22. At this point, liner material 50 may be cured to form elastomeric liner 40.

Figure 4:
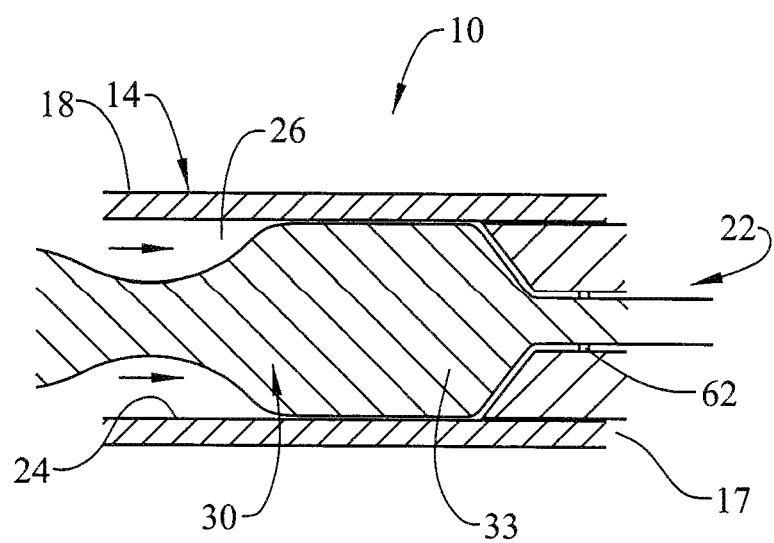
FIG. 4 depicts a valve arranged at a second end of the mud motor stator of FIG. 1, in accordance with an aspect of an exemplary embodiment.

In accordance with an aspect of an exemplary embodiment depicted in FIG. 3, an inlet valve 60 may be arranged in liner material delivery nozzle 44. Inlet valve 60 may be selectively controlled to establish a desired flow rate and flow volume of liner material 50. In accordance with another exemplary aspect depicted in FIG. 4, an outlet valve 62 may be arranged at second end 17. Outlet valve 62 may be selectively controlled to establish a desired backpressure in passage 26 in order to promote a more consistent coating of inner surface 24. Outlet valve 62 may also be controlled to allow an about of liner material 50 to pass from second end 17.

Figure 5:
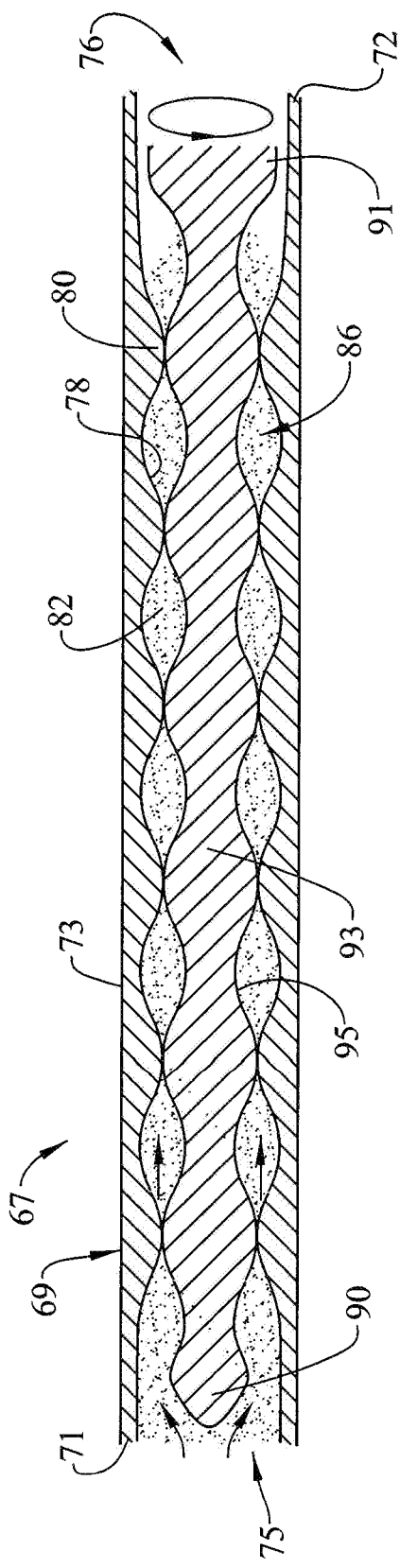
FIG. 5 depicts a mud motor stator in accordance with another aspect of an exemplary embodiment.

FIG. 5 depicts a mud motor stator 67 in accordance with another aspect of an exemplary embodiment. Mud motor stator 67 includes a body 69 having a first end 71, a second end 72 and an intermediate portion 73 extending therebetween. First end 71 defines a first opening 75 and second end 72 defines a second opening 76. Body 69 includes an inner surface 78 having a selected contour 80 that defines a passage 82.

Figure 6:
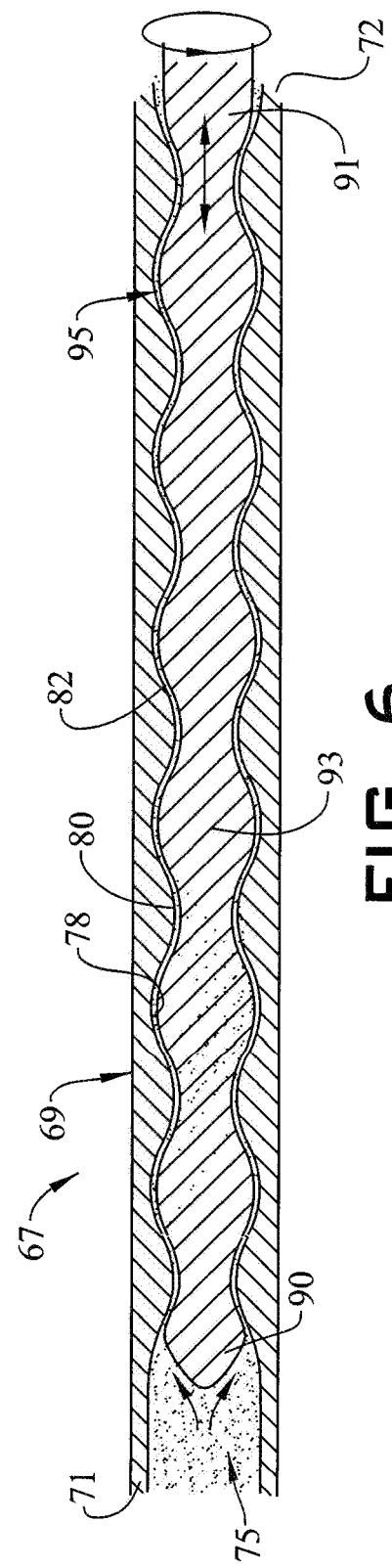
FIG. 6 depicts a mud motor stator in accordance with yet another aspect of an exemplary embodiment.

During a liner forming process, a mandrel 86 may be guided into passage 82. Mandrel 86 includes a first end portion 90, a second end portion 91, and an intermediate section 93 having a selected contour 95 extending therebetween. In this exemplary aspect, liner material 50 is applied to a pre-contoured surface, e.g., selected contour 80. The presence of selected contour 80 reduces an amount of liner material required. In the exemplary embodiment shown, selected contour 95 of mandrel 86 is spaced from selected contour 80 on inner surface 78 a selected distance such that mud motor stator 67 may be rotated independently of mandrel 86. It should be appreciated however spacing between selected contour 95 of mandrel 86 and selected contour 80 on inner surface 78 may be reduced as shown in FIG. 6 such that rotation of mud motor stator 67 would be dependent upon a complimentary rotation of mandrel 86.

Reference will now follow to FIG. 7 in describing a mud motor stator 110 formed in accordance with another aspect of an exemplary embodiment. Mud motor stator 110 includes a body 112 including a first end 114, a second end 115 and an intermediate portion 117 extending therebetween. First end 114 defines a first opening 120 and second end 115 defines a second opening 122. Body 112 includes an inner surface 128 having a selected contour 130 which defines a passage 131. In the exemplary embodiment shown, passage 131 includes a first substantially constant diameter portion 132 arranged at first end 114 and a second substantially constant diameter portion 133 arranged at second end 115. Selected contour 130 extends between first and second substantially constant diameter portions 132 and 133.

During a liner forming process, a mandrel 140 may be guided into passage 131. Mandrel 140 includes a first end portion 142, a second end portion 143 and an intermediate section 145 that includes a transition zone 147. Mandrel 140 includes a substantially linear portion 154 extending between first end portion 142 and transition zone 147 and a contoured portion 156 that extends between transition zone 147 and second end portion 143. Mandrel 140 may also include an end cap 160 arranged at second end portion 143. End cap 160 is fixed relative to mandrel 140. End cap 160 may support a bearing 162, or may include a bearing surface. Bearing 162 promotes relative rotation of mandrel 140 and mud motor stator 110. In accordance with one aspect of an exemplary embodiment, end cap 160 may include one or more passages 166.

For a liner forming process, a plug 174 may be positioned in substantially constant diameter portion 133 at second end 133 of body 112. Plug 174 is fixed relative to body 112 and mandrel 140 and includes a central passage 179 that may be receptive to substantially linear portion 154 of mandrel 140. Central passage 179 may include a bearing (not shown) or a bearing surface (also not shown) that promotes rotation of mandrel 140 as will be discussed herein. Plug 174 may also include one or more passages 182. In accordance with an exemplary aspect, mandrel 140 may be inserted into passage 131 with substantially linear portion 154 being supported at central passage 179. An amount of liner material 190 may be introduced into passage 131 via inlet passages 182. Amount of liner material may extend between first constant diameter portion 132 and second constant diameter portion 133.

At this point, mandrel 140 may be axially inwardly shifted such that contoured portion 156 registers with selected contour 130 and end cap 160 rests in first constant diameter portion 132 such as shown in FIG. 8. Mandrel 140 may then be rotated with substantially linear portion 154 being supported at central passage 179 and end cap 160 being supported at first constant diameter portion 132. Rotation may continue until liner material 190 cures forming an elastomeric liner (not separately labeled) on inner surface 128. In accordance with another exemplary aspect, instead of injecting liner material prior to axially shifting mandrel 140, contoured portion 156 may be arranged at selected contour 130 prior to injection. In this manner, an amount of liner material needed to form the elastomeric liner may be reduced.

Set forth below are some embodiments of the foregoing disclosure:

Embodiment 1

A mud motor stator having a passage including a first end defining a first opening, a second end defining a second opening and an intermediate portion extending therebetween, the method including introducing a liner material into the passage at one of the first end and the second end of the stator, inserting a mandrel having a contoured surface into the passage through one of the first end and the second end of the stator, shifting one of the mandrel and the stator relative to the other of the mandrel and the stator, and flowing the liner material over the contoured surface of the mandrel from the one of the first and second ends toward the other of the first and second ends to form a liner on the inner surface of the passage.

Embodiment 2

The mud motor stator according to any prior embodiment, wherein introducing the liner material includes directing the liner material through one or more openings formed in a plug arranged in the passage at the one of the first end and the second end.

Embodiment 3

The mud motor stator according to any prior embodiment, further comprising: discharging a portion of the liner material through one or more outlets provided at the other of the first end and the second end.

Embodiment 4

The mud motor stator according to any prior embodiment, wherein shifting the one of the mandrel and the stator includes rotating the one of the mandrel and the stator relative to the other of the mandrel and the stator.

Embodiment 5

The mud motor stator according to any prior embodiment, further comprising: pumping the liner material from the one of the first end and the second end towards the other of the first end and the second end through rotation of the one of the mandrel and the stator.

Embodiment 6

The mud motor stator according to any prior embodiment, wherein shifting the mandrel includes axially inserting the mandrel into the passage from one of the first end and the second end towards the other of the first end and the second end along the intermediate portion.

Embodiment 7

The mud motor stator according to any prior embodiment, wherein shifting the mandrel includes passing a mandrel including first end defining a substantially linear portion and a second end defining a contoured portion into the passage.

Embodiment 8

The mud motor stator according to any prior embodiment, further comprising: supporting the first end through a plug provided at one of the first end and the second end.

Embodiment 9

The mud motor stator according to any prior embodiment, further comprising: passing the substantially linear portion through a passage in the plug shifting the contoured portion into the liner material.

Embodiment 10

The mud motor stator according to any prior embodiment further comprising: supporting the second end of the mandrel at the other of the first end and the second end of the passage.

Embodiment 11

The mud motor stator according to any prior embodiment further comprising: rotating the contoured portion of the mandrel in the liner material.

Embodiment 12

The mud motor stator according to any prior embodiment, further comprising: supporting the second end of the mandrel through an end cap arranged at the other of the first end and the second end of the passage.

Embodiment 13

The mud motor stator according to any prior embodiment, wherein introducing the liner material includes injecting the liner material into the passage through at least one of the plug and the end cap.

Embodiment 14

The mud motor stator according to any prior embodiment, further comprising: rotating the contoured portion of the mandrel in the passage.

Embodiment 15

The mud motor stator according to any prior embodiment, wherein shifting one of the mandrel and the stator relative to the other of the mandrel and the stator includes aligning a contoured portion of the mandrel with a contoured profile of the stator.

Embodiment 16

The mud motor stator according to any prior embodiment, wherein introducing the liner material into the passage includes passing the liner material through a nozzle fixed relative to the stator and the mandrel at the one of the first end and the second end.

Embodiment 17

The mud motor stator according to any prior embodiment, wherein introducing the liner material through the nozzle includes passing the liner material through a nozzle inserted into the first end of the stator.

Embodiment 18

The mud motor stator according to any prior embodiment, further comprising: pumping the liner material from the first end along the intermediate portion of the stator.

Embodiment 19

The mud motor stator according to any prior embodiment, further comprising: discharging a portion of the liner material from the second end of the stator.

Embodiment 20

The mud motor stator according to any prior embodiment, further comprising: maintaining an adjustable back pressure of the liner material by controlling a valve arranged at one of the first end and the second end of the stator.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of forming a mud motor stator having an inner surface defining a passage including a first end defining a first opening, a second end defining a second opening and an intermediate portion extending therebetween, the method comprising:
    introducing a liner material into the passage at one of the first end and the second end of the stator;
    inserting a mandrel having a contoured surface into the passage through one of the first end and the second end of the stator;
    rotating the mandrel to pump the liner material from the one of the first and second ends to the other of the first and second ends;
    flowing the liner material over the contoured surface of the mandrel from the one of the first and second ends toward the other of the first and second ends while rotating the mandrel to form a liner on the inner surface of the stator; and
    curing the liner material on the inner surface.

2. The method of claim 1, wherein introducing the liner material includes directing the liner material through one or more openings formed in a plug arranged in the passage at the one of the first end and the second end.

3. The method of claim 2, further comprising: discharging a portion of the liner material through one or more outlets provided at the other of the first end and the second end.

4. The method of claim 1, wherein rotating the mandrel includes rotating the mandrel relative to the stator.

5. The method of claim 3, further comprising: pumping the liner material from the one of the first end and the second end towards the other of the first end and the second end through rotation of the one of the mandrel and the stator.

6. The method of claim 1, further comprising: axially inserting the mandrel into the passage from one of the first end and the second end towards the other of the first end and the second end along the intermediate portion.

7. The method of claim 6, further comprising: passing the mandrel including a first end portion defining a substantially linear portion and a second end portion defining a contoured portion into the passage.

8. The method of claim 7, further comprising: supporting the first end portion through a plug provided at one of the first end and the second end.

9. The method of claim 8, further comprising: passing the substantially linear portion through a passage in the plug axially passing the contoured portion into the liner material.

10. The method of claim 9, further comprising: supporting the second end portion of the mandrel at the other of the first end and the second end of the passage.

11. The method of claim 9, further comprising: supporting the second end portion of the mandrel through an end cap arranged at the other of the first end and the second end of the passage.

12. The method of claim 11, wherein introducing the liner material includes injecting the liner material into the passage through at least one of the plug and the end cap.

13. The method of claim 1, wherein rotating the mandrel includes aligning a contoured portion of the mandrel with a contoured profile of the stator.

14. The method of claim 1, wherein introducing the liner material into the passage includes passing the liner material through a nozzle fixed relative to the stator at the one of the first end and the second end.

15. The method of claim 14, further comprising: pumping the liner material from the first end along the intermediate portion of the stator.

16. The method of claim 15, further comprising: discharging a portion of the liner material from the second end of the stator.

17. The method of claim 1, further comprising: maintaining an adjustable back pressure of the liner material by controlling a valve arranged at one of the first end and the second end of the stator.

18. The method of claim 1, wherein the liner material is an elastomeric material.

19. The method of claim 1, wherein the passage includes a substantially constant diameter extending from the first end to the second end.

* * * * *